US010613954B1

United States Patent
Bellingan et al.

(10) Patent No.: US 10,613,954 B1
(45) Date of Patent: Apr. 7, 2020

(54) TESTING FRAMEWORK FOR HOST COMPUTING DEVICES

(71) Applicant: Amazon Technologies, Inc., Reno, NV (US)

(72) Inventors: Carl Bellingan, Riebeek West (ZA); Matthew James Eddey, Cape Town (ZA); Anton André Eicher, Hout Bay (ZA); Atle Normann Jorgensen, Cape Town (ZA); André Mostert, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 561 days.

(21) Appl. No.: 13/932,946

(22) Filed: Jul. 1, 2013

(51) Int. Cl.
*G06F 11/00* (2006.01)
*G06F 11/22* (2006.01)

(52) U.S. Cl.
CPC ................................ *G06F 11/2294* (2013.01)

(58) Field of Classification Search
CPC ............... G06F 11/079; G06F 11/3409; G06F 11/3428; G06F 11/3447; G06F 11/3452
USPC ........................ 714/26, 47.2, 47.3
See application file for complete search history.

(56) References Cited

U.S. PATENT DOCUMENTS

| | | | | |
|---|---|---|---|---|
| 6,550,024 B1 * | 4/2003 | Pagurek | ............... | G06F 11/0709 714/47.2 |
| 6,701,342 B1 * | 3/2004 | Bartz | ................. | H04L 41/5003 370/395.21 |
| 7,082,463 B1 * | 7/2006 | Bradley | .............. | H04L 41/5003 709/223 |
| 7,231,555 B2 * | 6/2007 | Barnard | .............. | H04L 12/2697 702/118 |
| 7,693,983 B1 * | 4/2010 | Gupta | ..................... | H04L 12/14 709/221 |
| 7,930,593 B2 * | 4/2011 | Ozonat | ............... | G06F 11/0709 714/33 |
| 7,945,658 B1 * | 5/2011 | Nucci | ................... | H04L 41/065 370/238 |
| 8,706,864 B1 * | 4/2014 | Brandwine | ......... | H04L 41/5019 709/224 |
| 8,862,727 B2 * | 10/2014 | Jayachandran | ..... | G06F 11/0754 709/224 |
| 9,015,668 B1 * | 4/2015 | Michelsen | .......... | G06F 11/3688 717/120 |
| 2002/0165952 A1 * | 11/2002 | Sewell | ................ | H04L 41/0266 709/224 |
| 2005/0114500 A1 * | 5/2005 | Monk | ................. | H04L 12/2602 709/224 |
| 2009/0019319 A1 * | 1/2009 | Ooba | .................... | G05B 23/021 714/47.2 |
| 2009/0204795 A1 * | 8/2009 | Nasuto | ................ | G06F 11/3404 712/227 |

(Continued)

*Primary Examiner* — Elmira Mehrmanesh
(74) *Attorney, Agent, or Firm* — Hogan Lovells US LLP

(57) ABSTRACT

Systems and methods for performing diagnostic tests within a multi-tenant environment are described. Diagnostics are performed on one or more components, such as host computing devices. The one or more components send resulting diagnostic information to an ingester which collects the diagnostic information. The ingester then sends the diagnostic information to a database. A generator is able to query the information in the database and create metrics. Based at least in part on metrics, an alarm may be triggered.

20 Claims, 6 Drawing Sheets

(56) References Cited

U.S. PATENT DOCUMENTS

| | | | |
|---|---|---|---|
| 2010/0058366 A1* | 3/2010 | Swildens | G06F 11/3414 |
| | | | 719/329 |
| 2011/0161360 A1* | 6/2011 | Lundstrom | H04L 41/0213 |
| | | | 707/769 |
| 2011/0214006 A1* | 9/2011 | Meek | G06F 11/0709 |
| | | | 714/2 |
| 2013/0086411 A1* | 4/2013 | Bauer | G06F 11/3051 |
| | | | 714/3 |

* cited by examiner

TESTING FRAMEWORK FOR HOST COMPUTING DEVICES

BACKGROUND

As an increasing number of applications and services are being made available over networks such as the Internet, an increasing number of content, application, and service providers are turning to technologies such as resource sharing, multi-tenant environments, and cloud computing. Such technologies can enable a user to obtain access to electronic resources through services, such as Web services, where the hardware and/or software used to support those services is dynamically scalable to meet the needs of the services at any given time. A user or customer typically will rent, lease, or otherwise pay for access to these resources, and thus does not have to purchase and maintain the hardware and/or software to provide access to these resources.

In at least some environments, a provider of these resources can be responsible for tasks such as upgrading and deploying software, as well as managing configuration information for the various resources. In some cases, errors can occur on these machines which may affect their ability to update information, deploy code, modify settings, or perform other activities with respect to the various resources. These errors are often costly for the provider of these resources.

BRIEF DESCRIPTION OF THE DRAWINGS

Various embodiments in accordance with the present disclosure will be described with reference to the drawings, in which.

DETAILED DESCRIPTION

Figure 1:
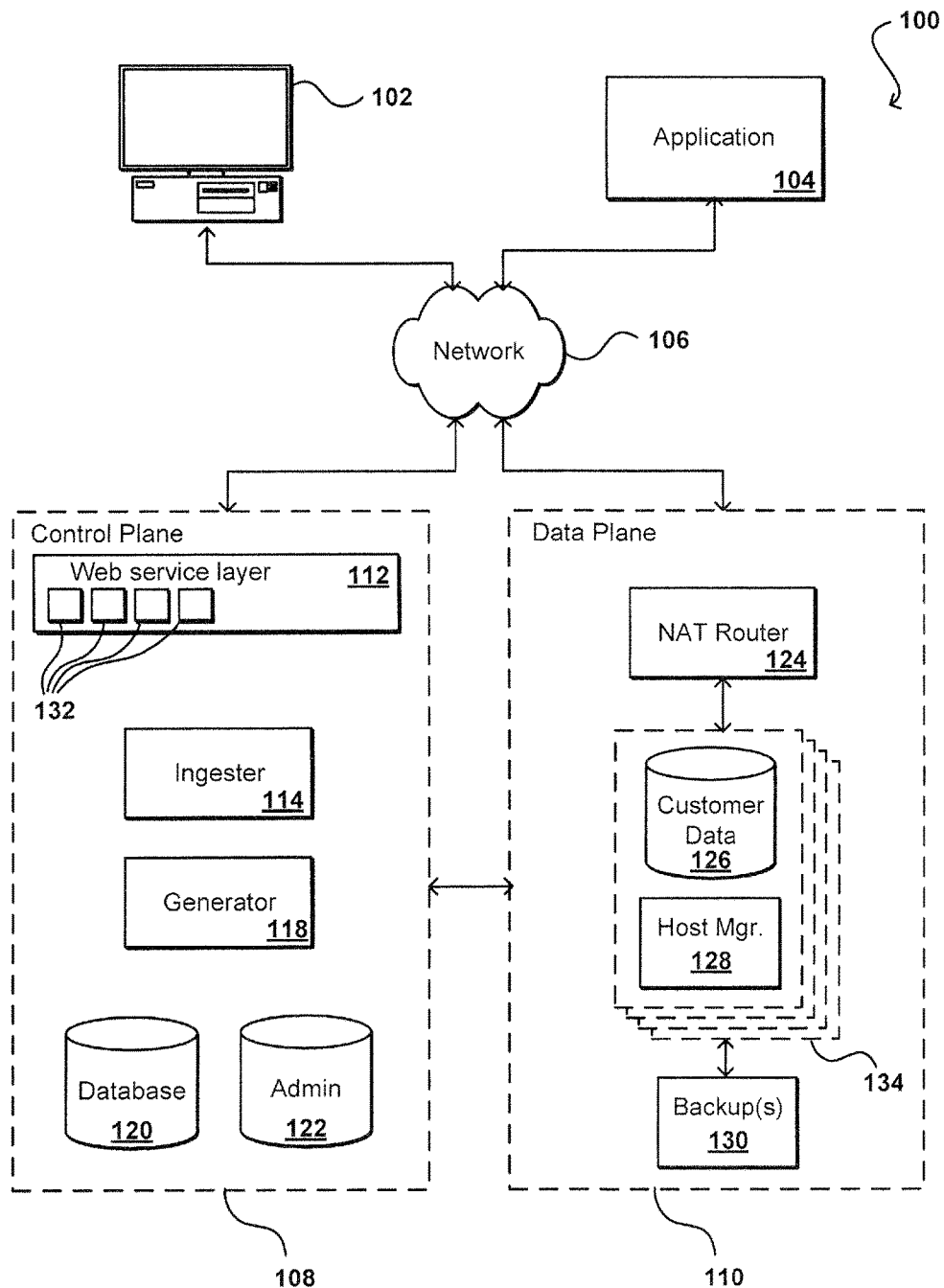
FIG. 1 illustrates an environment in which various embodiments can be implemented, in accordance with various embodiments.

Systems and methods in accordance with various embodiments of the present disclosure may overcome one or more of the aforementioned and other deficiencies experienced in conventional approaches to detecting specific properties and/or errors across one or more computing devices. In particular, various embodiments disclose diagnostic tests (diagnostics) that are executed on host computing devices (hosts) and/or other components in a multitenant computing environment, where each host computing device may host one or more virtual machines. It should be appreciated that herein, the term host computing device is used as an illustrative example. In other words, although the term host computing device is used throughout the instant disclosure, components such as hardware, software, and/or firmware may be used interchangeably with host computing devices. Moreover, diagnostics discussed herein are capable of testing devices remote from a host computing device, such as a switch or router.

The results of the diagnostic tests can be sent from the host computing devices to a central service where the results can be aggregated and used to determine and/or indicate errors, generate notifications and perform other functions. Example diagnostic tests include determining errors from information in log files, determining hard disk failures, determining memory failures, determining types of software and hardware, etc. Results from diagnostic tests may assist with determining the cause of disk failures, determining hosts that comprise particular diagnostic information (e.g., data received from and/or created by a diagnostic test), classifying failure patterns, identifying similarities and differences between various hosts, metric generation, host reboots, software updates, service restarts, etc. The number of diagnostic tests run on host computing devices can range from a few to hundreds or thousands (e.g., 1, 10, 150, 1,000, etc.). Diagnostic tests may run at periodic intervals, for a particular period of time, or for an indefinite period of time. In some embodiments, the results of one diagnostic test may determine a time at which another diagnostic test is run. For example, if a diagnostic test indicates that a host cannot launch new virtual machines (VMs), a diagnostic test may run more frequently to determine when the host can launch new VMs.

In various embodiments, an agent included in a host samples information (e.g., diagnostic information) on the host according to various diagnostic tests. An agent may send diagnostic information received from diagnostic tests to a system including an ingester. An ingester, in an embodiment, is a piece of software, hardware, or firmware operable to aggregate diagnostic information from a plurality of hosts. As an example, an ingester receives information from hosts and sends that information to a database. In some embodiments, the ingester may be located with the database, or at some other central location to receive information from the plurality of hosts. In some embodiments, switches or other components that are not located on a host may send diagnostic information to an ingester. In some embodiments, information may be sent to an ingester using a distributed queue messaging service. Further, information may be sent at to an ingester at various time intervals such as every 5 minutes, every hour, every week, every time a host reboots, every time software is upgraded on a host, etc.

An ingester may send received information to a database, such that the database can join related diagnostic information. For example, a database may join information from a host, a switch, a storage device, a combination of hosts and other devices, etc. In some embodiments, a generator can run structured query language (SQL) queries on a database to find and/or classify various error conditions. The generator may produce metrics based at least in part upon information derived from a database. In various embodiments, metrics received from a generator may be used to identify properties and/or errors. Some embodiments utilize this information to attempt to determine a cause of failures or anomalous behavior associated with at least a portion of the host computing devices. For example, by examining metrics, a system can determine a subset of host computing devices with similar errors. Moreover, by determining similar properties associated with the host computing devices with similar errors, a root cause of the errors may be determined. Such a technique can assist a user, such as an engineer or technician, with investigating and finding the cause of an error quicker than if the user were to execute diagnostic tests from a remote location on individual host computing devices.

In various embodiments, one or more alarms may be triggered based at least in part on metrics provided by a generator. For example, one type of alarm may be triggered if one host has a particular failure, while another type of alarm may be triggered if multiple hosts demonstrate a particular failure. In some embodiments, particular metrics may not generate an alarm at all. It should be understood that a notification may be generated in place of an alarm, and that a notification may comprise the same properties as an alarm.

In some embodiments, a console is displayed. A console may be a graphical user interface (GUI), that provides a user with the ability to sample the database. A console may be a web portal, a program run on a host device, or a program run on a device remote from the host computing devices. A console may display various metrics, including, but not limited to: hosts containing errors, hosts that are likely to develop errors, hosts that are unable to launch new virtual machines, hardware and/or software failures, etc. In various embodiments a console may group metrics together in a manner that allows a user to easily diagnose an error and/or failure. In addition, a console may provide predefined queries for a user. In some embodiments, diagnostics and/or queries may be shared amongst various users associated with disparate sets of hosts. For instance, if a user notices a particular error, that user may view and/or run diagnostics and/or queries developed by other users who encountered a similar error. In some embodiments, the console may display an alarm and/or a notification to a user.

In some embodiments, a remediator may be coupled with a generator and/or metrics. For example, a remediator may receive a set of metrics, and based at least in part on those metrics, the remediator may automatically repair errors found on various hosts or other devices. In other embodiments, a remediator may repair errors in response to a user command. In some embodiments, if a query determines that a set of hosts are not problematic, a remediator may receive this information such that it knows to exclude those hosts from remediation.

Moreover, in various embodiments, association rule learning is used to determine the causes of errors. Association rule learning is a technique that can determine variable (e.g., items and/or processes) that are associated with one another in a database. As a general example, association rule algorithms take the form shown in Equation 1, wherein when items $A_i$ appear, items also appear with a certain probability:

$$\{A_1, A_2, \ldots, A_n\} \rightarrow \{B_1, B_2, \ldots, B_m\} \qquad \text{Equation 1}$$

Similarly, with reference to example embodiments described herein, the rule:

$$\{\text{Property } X, \text{Property } Y\} \rightarrow \{\text{Host Computing Device Failure}\} \qquad \text{Equation 2}$$

may indicate that if Property X and Property Y are present on the same host computing device, that host computing device will fail. These rules may be predefined or determined in real time.

Various other applications, processes and uses are presented below with respect to the various embodiments.

FIG. 1 illustrates an example of an electronic resource environment 100 that can be used in accordance with various embodiments. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration (Admin) data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. As will be discussed below in more detail, the control plane, in some embodiments, may include an ingester 114 that aggregates data from various host computing devices and/or virtual machines. In some embodiments, the ingester 114 may pass information to a database 120, which may be queried by a generator 118 to produce metrics. An ingester 114 can receive information to determine active VMs, resource VMs, or other such resources or components 134 in the data plane 110. Monitoring components as described herein can constantly monitor the health of all the running repositories and/or VMs for the control plane, detect the failure of any of these VMs, and initiate the appropriate recovery process(es).

Each resource VM 134 in the data plane can include at least one data store 126 and a host manager component 128 for the machine providing access to the data store. A host manager in one embodiment is an application or software agent executing on a VM and/or application server, such as a Tomcat or Java application server, programmed to manage tasks such as software deployment and data store operations, as well as monitoring a state of the data store and/or the respective VM. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the VMs for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

Once a VM is provisioned and a user is provided with a DNS address or other address or location, the user can send requests "directly" to the data plane 110 through the network using a Java Database Connectivity (JDBC) or other such client to directly interact with that VM 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as VM or availability failures, for example, can be masked by programmatically remapping a DNS address to any appropriate replacement VM for a use. A request received from a user 102 or application 104, for example, can be directed to a network address translation (NAT) router 124, or other appropriate component, which can direct the request to the actual VM 134 or host corresponding to the DNS of the request. As discussed, such an approach allows for VMs to be dynamically moved, updated, replicated, etc., without requiring the user or application to change the DNS or other address used to access the VM. As discussed, each VM 134 can include a host manager 128 and a data store 126, for example, and can have at least one backup VM or copy in persistent storage 130. Using such an approach, once the VM has been configured through the control plane, a user, application, service, or component can interact with the VM directly through requests to the data plane, without having to access the control plane 108. For example, the user can directly issue SQL or other such commands relating to the data in the VM through the DNS address. The user would only have to access the control plane if the user wants to perform a task such as expanding the storage capacity of an VM. In at least one embodiment, the functionality of the control plane 108 can be offered as at least one service by a provider that may or may not be related to a provider of the data plane 110, but may simply be a third-party service that can be used to provision and manage data VMs in the data plane, and can also monitor and ensure availability of those VMs in a separate data plane 110.

Figure 2:
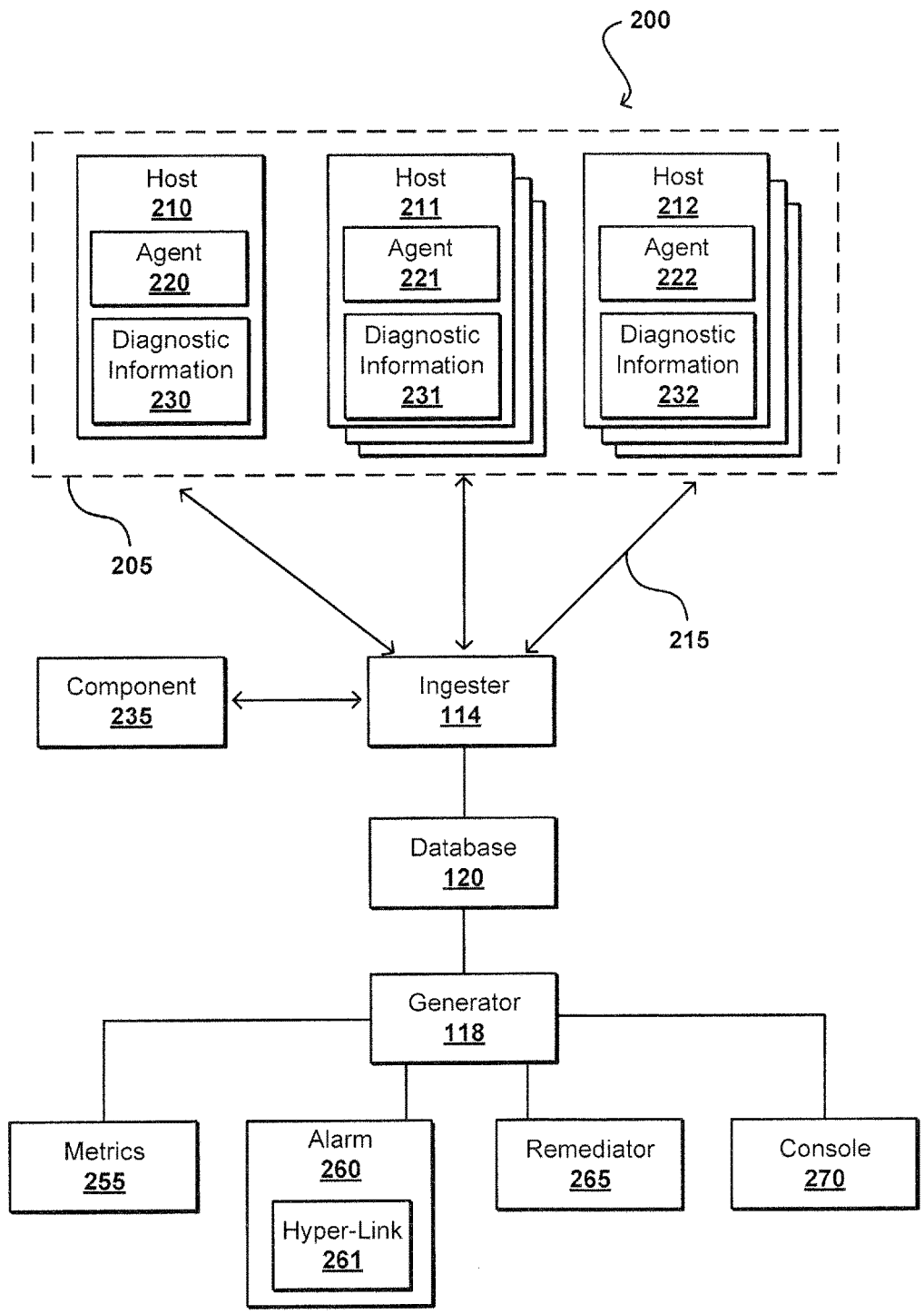
FIG. 2 illustrates an example block diagram of a system, in accordance with various embodiments.

FIG. 2 illustrates a view 200 of a portion of an environment such as that illustrated in FIG. 1. In an embodiment, test framework 200 comprises a group of hosts 205, including hosts 210, 211 and 212. These hosts may correspond with hosts illustrated in other figures. As illustrated, in an embodiment, hosts may comprise an agent 220, 221 and 222. In various embodiments an agent is operable to perform diagnostic tests on a host. An agent may sample the state of a host (e.g., run diagnostic tests) at various time intervals (e.g., 30 seconds, 1 minute, 5 minutes, 30 minutes, 1 hour, 1 day, 1 week, etc.). In some embodiments, a command may be sent by a component remote from a host that causes a diagnostic test stored on or invokable by an agent to be performed. For example, before sending a notification or triggering an alarm, a component such as an alarm 360 or generator 350 may cause a diagnostic test to run.

In various embodiments, a diagnostic test gathers diagnostic information 230, 231 and 232. Diagnostic information can include information associated with a host and/or information associated with components within a host. For example, diagnostic information may include, but is not limited to information such as: the type of host, the type of agent, a time that firmware was last upgraded on a host, a time a particular component was installed on a host, a decrease or increase in the amount of available resources on one or more hosts, the amount of time it takes to launch a VM on one or more hosts, whether particular services on a host can communicate with an agent, the amount of time a host or component was impaired, networks a host is connected to, operating systems available on a host, host resource availability, host resource capacity, types of software on a host, versions of software on a host, types of firmware on a host, versions of firmware on a host, types of hardware on a host, versions of hardware on a host, software failures or errors on a host, hardware failures or errors on a host, ambient error rates associated with a host, whether VMs are able to be launched on a host, a geographic location of a host, an identification of a user utilizing a host, virtual machines being run on a host, etc. As another example, diagnostic information may include a load amount in relation to an amount of available resources on a VM. For example, micro VMs may provide a small amount of consistent CPU resources and allow a user to increase CPU capacity in short bursts when additional cycles are available. While a particular load on a micro VM may indicate that the micro VM is overloaded, an alarm may react in a different way if the same load is on a larger VM. As yet another example, diagnostic information may indicate vulnerabilities associated with a host or other component. By aggregating data associated with vulnerabilities, particular hosts (e.g., a type of host) may be identified and the vulnerability may be remediated.

In some embodiments, diagnostic tests may be initiated by a device remote from the host. For example, rather than a diagnostic test being initiated by an agent, a switch that serves the host may initiate a diagnostic test. Various components may also initiate diagnostic tests, which may then be sent for analysis along with the results of diagnostic tests initiated by an agent on a host.

In some embodiments, an ingester 114 receives information from a host or another component 235, such as a switch or a device on the control plane 108. In one example, after running diagnostic tests on a host, an ingester may receive information associated with the diagnostic tests. As discussed above, diagnostic tests may be initiated by an agent, or a component remote from the host. In an embodiment, diagnostic information collected from a diagnostic test may be sent to an ingester using a distributed queue messaging service 215. In some examples, Web service applications may send messages to an ingester. In some embodiments, an ingester can aggregate information associated with diagnostic tests before sending the information elsewhere. In other embodiments, data may be aggregated at another component such as a database.

With continued reference to FIG. 2, in various embodiments, an ingester is coupled with a database 245. By coupling an ingester with a database, diagnostic information associated with various hosts and components can be aggregated and stored in a database, in one example. A database, or any type of data structure fit for storing the diagnostic information associated with hosts, can provide a consistent or somewhat consistent view of the diagnostic state of an entire fleet of hosts.

In various embodiments, a generator 250 is coupled with a database. A generator can sample a database using SQL queries to derive metrics 255. Thus, in some embodiments, a generator can gather information related to all hosts in a multi-tenant environment. In various embodiments, queries may be predefined or created by a user after a generator is activated. For example, a query may extract information associated with each host experiencing a particular type of hardware failure. In another example, a query may extract information associated with each host comprising a particular version of software. This information can then be stored as metrics which may be used to trigger an alarm and/or generate a notification. Moreover, in some embodiments, a service level agreement may be generated based on metrics. For example, a service level agreement may indicate that the cost of using a host is higher if the computing resources on the host computing devices are lower than an expected average amount.

In some embodiments, an ingester, a database, and a generator are components of a web service. Of course, additional components discussed within the present disclosure may be implemented as part of a web service. Moreover, components such as an ingester, a database, and a generator, for example, may be implemented on a plurality of devices. For instance, one or more ingesters, databases, and generators may be distributed and execute on one or more host computing devices. In various embodiments, operations performed by ingesters, databases and generators may be executed in parallel. Again, other components discussed herein may perform operations in parallel. For example, at least two alarms may be generated by at least two generators simultaneously. As another example, one generator may create metrics by sampling a plurality of databases that reside on a plurality of host computing devices. As yet another example, diagnostic information may be sent to a single ingester, or a plurality of ingesters located on separate machines. Information from the various ingesters may then be sent to a single database, or a plurality of databases, for example. Thus, it should be understood that while FIG. 2 is an illustration of an example implementation, the components described in FIG. 2 may be distributed on a plurality of devices and communicate with one another.

In various embodiments, data gathered from a database may assist a user with determining which hosts are failing. For example, a query may be written that retrieves all hosts (or identifiers associated with hosts) with a broken hard disk drive. In some embodiments, a database may indicate that a host is stuck and will not launch new VMs. In various embodiments, a diagnostic test may highlight the problem, and change the frequency with which a particular test is run in order to determine when the host is able to launch new VMs.

As discussed above, in some embodiments association rule learning is utilized to determine the causes of errors. Association rule learning is a technique that can determine variable (e.g., items and/or processes) that are associated with one another. For example, the rule:

$$\{\text{Property } X, \text{Property } Y\} \rightarrow \{\text{Host Computing Device Failure}\} \qquad \text{Equation 3}$$

may indicate that if Property X and Property Y are present on the same host computing device, that host computing device will fail. Rules may be predefined or determined in real time. In one example, when one property and/or error is found on a host, a diagnostic test may automatically execute to determine whether another property and/or error is found on that host. For example, with reference to equation 3, if Property X is found on one or more hosts, those one or more hosts may perform diagnostic tests which test for Property Y. On machines where Property X and Property Y are found an alarm may be triggered, a notification may be sent, or a remediator may repair the host such that Property X and Property Y are not present on the host, for example. In the case where a remediator repairs a host, a method for remediation for a particular error is stored on a memory device.

A remediator 265 is also shown in FIG. 2, in accordance with various embodiments. In some embodiments, diagnostic tests and/or metrics may indicate a particular problem, for which a particular solution is associated. In this case, the problem may be automatically remediated (e.g., repaired) such that a user would not need to adjust anything manually. In various embodiments, errors and/or failures that can be automatically remediated may be shown in an alarm, while in other cases they are automatically remediated and not shown in an alarm. In some embodiments, errors and/or failures that may be automatically remediated may be recorded in an error log (not shown). Thus, automatic remediation allows users to respond more quickly to service failures since it discriminates between errors that require user intervention and errors that can be automatically remediated.

FIG. 2 further illustrates and example alarm 260. In an embodiment, an alarm is sent to a user. An alarm may be triggered based on a set of metrics, such as when a set of metrics exceeds a particular threshold or satisfies some predefined criteria. For example, an alarm may be triggered when a set of metrics indicates that a certain number of hosts are experiencing a particular type of failure. In some embodiments an alarm causes an action, such as pulling a host computing device offline. In some embodiments, and alarm may comprise information associated with the cause of the alarm. For instance, an alarm may comprise a plurality of sections, similar to a notification. For example, an alarm may include information such as, but not limited to: errors, properties, correlations, symptoms of errors, host computing device identifiers, diagnostic information, warnings regarding possible future errors, solutions indicating how to repair errors, multi-tenant environment information, information regarding whether errors can automatically be remediated, etc. Alarms may contain information regarding why two errors are correlated, which may help a user determine the cause of an error. In some embodiments, an alarm may comprise a hyper-link 261 and/or reference that, when selected (e.g., clicked on), may cause the display of a console 270. In other embodiments alarms may be shown on a console. It should be appreciated that alarms may comprise information associated with all host computing devices within a multi-tenant environment, or at least a subset thereof.

Alarms may be sent to a user in a variety of ways. In some embodiments, alarms are generated and sent to users through email. Email alarms may be sent in predetermined intervals (e.g., hourly, daily, monthly), upon request by a user, or at a time associated with then the alarm is generated (e.g., when an error is discovered). In other embodiments, alarms may be generated and viewed when a user accesses a console and/or a management tool. It should be appreciated by those of skill in the art that merely because an alarm is generated, an alarm does not necessarily need to be sent. In one embodiment, an alarm may be generated upon demand, such as when a user signs into a web portal, for example. Regardless of how or when an alarm is generated, alarms can be sent to users in a number of methods including, but not limited to: text message, instant message, via a program running on the machine of a user, etc. In some cases, an alarm may be sent to a user immediately when a particular type of error, failure, or metric is found. For instance, if particular metric is known to cause failures, an alarm may be sent to a user without waiting for a scheduled time to send the alarm. As discussed above, a notification may be perform the same functions as alarm (e.g., be created by a generator, include text and hyper-links/references, display on a console, etc.).

Figure 3:
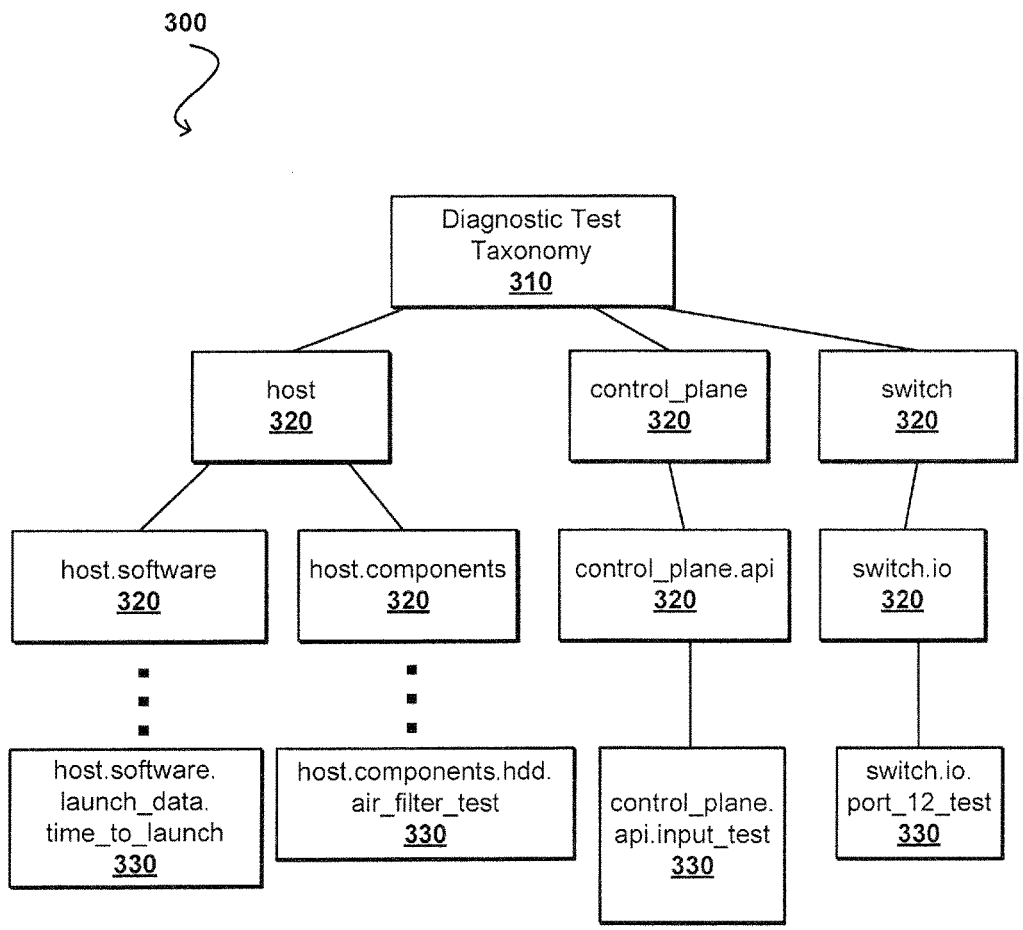
FIG. 3 illustrates an example taxonomy of diagnostic tests, in accordance with various embodiments.

FIG. 3 illustrates an example taxonomy of diagnostic tests. In some embodiments, diagnostic tests may be shared amongst various teams working on various fleets. For example, diagnostic tests (also referred to herein as code comprising diagnostic tests) may be stored in a repository such that a machine which does not have access to a particular set of hosts may have access to diagnostic tests that run on those hosts. It should be understood that there are numerous ways for diagnostic tests to be stored and accessed. Diagnostic tests may be stored in a centralized location, on a virtual machine, on a network drive, in a distributed environment, etc.

In one example, diagnostic tests are stored in a tree data structure 300. For example, the set of all diagnostic tests may be associated with a root node 310, various classes or types of diagnostic tests may be associated with mid-level nodes 320, and particular diagnostic tests may be associated with leaf nodes 330. For example, diagnostic tests that test hard drives may fall within a group of tests that test components on hosts. For example, all hard disk drive tests may have a naming scheme that starts with the prefix host.components.hdd. Thus, for example, hard disk drive tests may be named: host.components.hdd.air_bearing_surface_test, hostcomponents.hdd.head_test, host.components.hdd.air_filter_test, etc. It should be understood that there may be more, or fewer nodes within a tree. For example, the ellipses between the host.software node and the host.software.launch_data.time_to_launch node indicates that there may be nodes between the host.software node and the host.software.launch_data.time_to_launch node. In various embodiments, users unfamiliar with a family of tests may view a set of diagnostics, and easily traverse the classes of diagnostics until the user finds a the diagnostic test they are searching for. In some embodiments, diagnostic tests comprise meta data that describes the attributes of a test, such as its functionality, inputs, outputs, etc. Also, in some embodiments, users may add diagnostic tests to a set of diagnostic tests.

In some embodiments, various tests are ran when a VM is launched. These tests may include whether a computing device can communicate with a VM, whether a computing device can see a virtual interface associated with a VM, whether a computing device can communicate with a service on a VM, etc. The results of these tests may be sent to an ingester in the same manner as any diagnostic test. By testing a VM when it is launched, a database or other data structure may store data associated with an VM throughout its lifespan. For example, as tests capture information associated with a VM at particular intervals, information received from the tests may indicate how long a VM was in service for, how long it was impaired, what caused the impairment, etc. Machine learning, as discussed above, may be applied here in order to classify various anomalies such that they may be remediated in subsequent situations.

Figure 4:
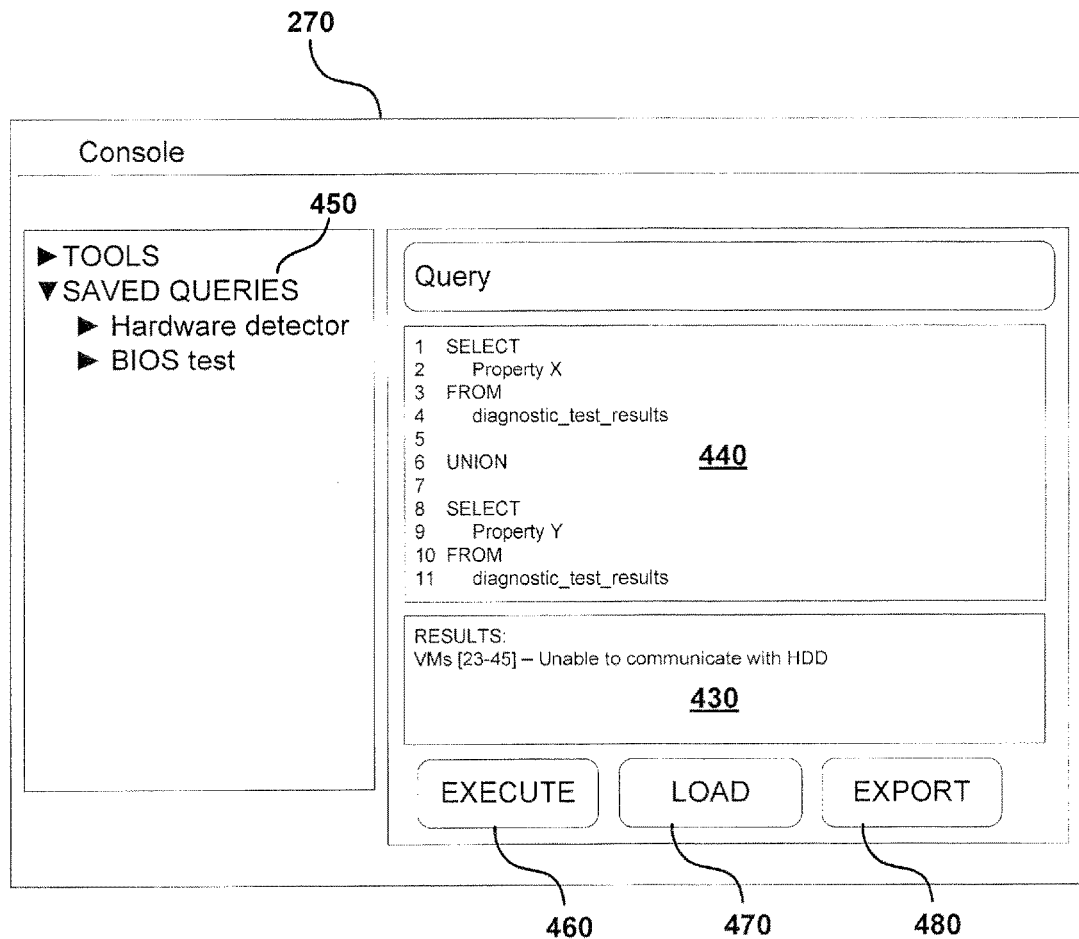
FIG. 4 illustrates an example console, in accordance with various embodiments.

FIG. 4 illustrates and example a console 270 that may be displayed. In various embodiments, a console is a graphical user interface (GUI) which can access a database. A console may display metrics including which hosts are causing an alarm, errors/failures/properties that hosts have in common, possible solutions associated with repairing errors, etc. In some embodiments, a console comprises a display area 440 which may display queries, indicate failures, indicate hosts that have failed, indicate possible solutions to assist a user with determining the cause of a failure, display information associated with one or more alarms, display various diagnostic information, display results of diagnostic tests, etc. In various embodiments, more than one display area (e.g., a results display area 430) may display the same and/or similar information.

A console can allow users to execute 460, load 470, or export 480 queries. For example, a user can load a query written by someone else (e.g., another team of engineers, TT professionals, users, etc.) by selecting a load control (e.g., a load button). In some embodiments, a console is operable to export and/or save queries. For example, a console may retrieve the stored queries at a later point in time. In one example, a user and/or team of users that are prevented from accessing and/or viewing a set of hosts may access queries created for the set of inaccessible hosts. As an example, if user A had access to a set of host computing devices and created diagnostic tests for those host computing devices, user B would be provided access to the diagnostic tests created by user A, even though user B is prevented from viewing user A's set of host computing devices. In addition, in various embodiments, a console may display saved queries 450. Much like a music playlist GUI, in various embodiments a console may display and/or allow a user to access frequently used queries, recently modified queries, queries originating from a different user, a link to a query library or query tree, etc. In some embodiments, a first user is exposed to queries (e.g., via the console) written by one or more other users for the one or more other users' hosts, even though the first user is prevented from accessing and/or viewing the one or more other users' hosts.

In various embodiments, a console may display errors, properties, failures, etc. For example, in some embodiments associated errors, properties and/or failures may be grouped together. For example, if a plurality of machines are unable to launch VMs or a particular piece of software, a console may list the machines that are unable to launch VMs. In some embodiments, as discussed herein, an alarm or notification may comprise a reference or link that directs them to a console.

Figure 5:
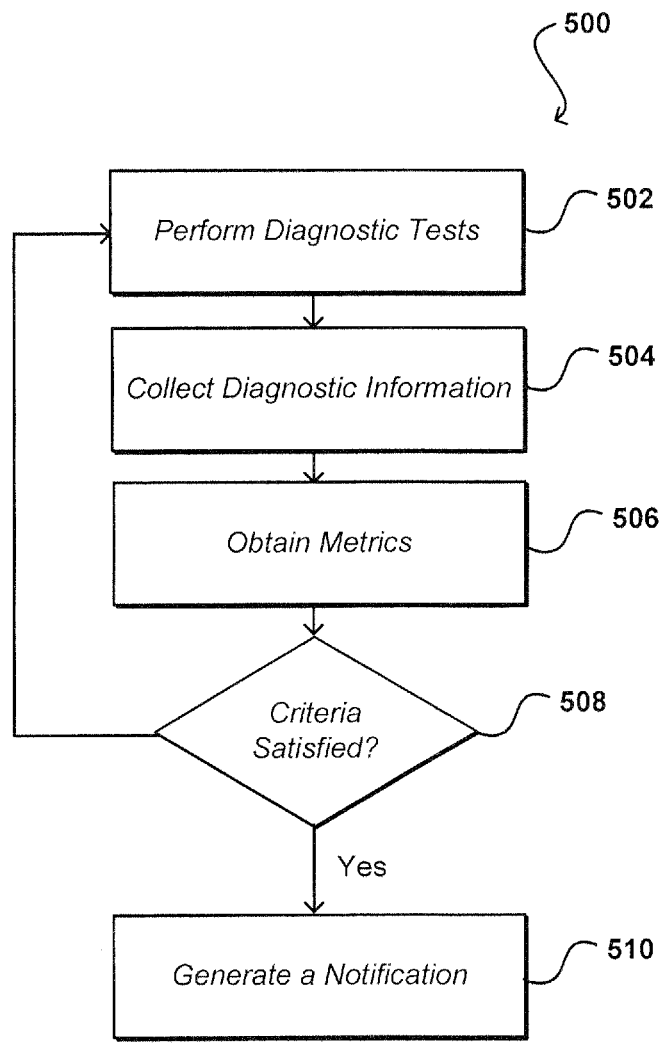
FIG. 5 illustrates an example flow diagram, in accordance with various embodiments.

FIG. 5 illustrates an example flow diagram 500 for monitoring host computing devices in a multi-tenant environment. It should be understood that for this and other processes discussed herein that there can be additional, fewer, or alternative steps performed in similar or alternative orders, or at least partially in parallel, within the scope of the various embodiments unless otherwise stated. For example, another step may be added which displays a console. As another example, tasks such as performing diagnostic tests and collecting diagnostic information at an ingester may be performed at least partially in parallel. Thus, it should be appreciated that while flow diagram 500 shows that steps 502, 504, 506, 508 and 510 are each performed, in accordance with one embodiment, steps 502, 504, 506, 508, and 510 each describe steps that may, or may not, be performed in any order. In other words, flow diagram 500 is meant to be an illustrative example of how monitoring hosts in a multi-tenant environment could be performed, and should not be construed as being anything other than an example.

In this example, one or more diagnostic tests are performed 502. As discussed above, diagnostic tests may be performed on host computing devices, or components related to host computing devices such as switches. In some embodiments, code for executing the diagnostic tests is stored on, or available to, agents which are stored on host computing devices. Thus, in some embodiments, the host computing device may nm a diagnostic test on its own accord, or receive a command to run a diagnostic test stored in an agent, among other such options. In other embodiments, one or more diagnostic tests may be sent to a host computing device. In such a case, diagnostic tests residing on an agent and/or diagnostic tests residing in a location remote from an agent may be executed on a host computing device. In various embodiments, diagnostic tests may be accessed by a variety of users and/or machines. For example, a machine remote from a fleet of host computing devices may retrieve a diagnostic test from an agent, a repository located within the fleet, or a repository remote from the fleet. This allows a machine remote from a fleet to use diagnostic tests on its own fleet of host computing devices. In various embodiments, diagnostic tests are operable to retrieve diagnostic information which may include properties and/or errors associated with a host computing device and/or a component associated with the host computing device. As discussed herein, a component may include hardware, software, firmware, etc.

Continuing with the example shown in FIG. 5, in one embodiment, diagnostic information is collected 504 at an ingester. An ingester is operable to collect diagnostic information from host computing devices and/or other devices and/or components associated with those host computing devices. For example, an ingester may collect and/or sort data received from various sources via a distributed queue messaging service. By using a distributed queue messaging service, messages may be received without a bottleneck and in a sequential order at an ingester, in accordance with various embodiments.

In various embodiments, an ingester sends collected diagnostic information to a database. By sending the diagnostic information to a database, various components are able to query (also referred to as sample) the database and retrieve information in an ordered fashion. For instance, a generator may send an SQL query to a database requesting information related to all machines experiencing a no-launches failure (i.e., when a host cannot instantiate a new VM). It should be understood that, in various embodiments, an ingester may be software located on the same machine as a database.

With continued reference to flow diagram 500, metrics are generated 506 in accordance with various embodiments. In various embodiments, a generator is operable to sample a database using SQL queries. The results of these queries can then be collected and sorted into various arrangements. For example, a generator may create metrics that are sorted by a type of error, a group of machines, the probability of a host failure, etc. In some embodiments, metrics may indicate errors which may be automatically remediated, as discussed above. In other embodiments, metrics may be used to create an alarm or notification.

In some embodiments, an alarm and/or notification is generated 510 when various metrics satisfy at least one criterion 508. In such an example, if criteria are not satisfied, an alarm is not generated and flow diagram 500 returns to step 502 to perform diagnostic tests. In other embodiments, flow diagram 500 does not return to step 502 when criteria is not satisfied. As discussed above, metrics may include errors associated with various hosts, as an example. If a particular error occurs on at least a particular number of host computing devices, then a criteria may be satisfied. For example, if 5 machines are stuck in no-launches, an alarm might not be triggered because a criteria (or rule) may be dictate that 10 machines must be stuck in no-launches before an alarm is triggered. In such a case, when 11 machines become stuck in no-launches an alarm may be triggered. A criteria may be created by a user or may be predefined (e.g., before host computing devices are activated). As with various queries, in some embodiments criteria configurations may be shared amongst different fleets of machines. These criteria configurations may be stored in a host computing device, a repository local to an electronic resource environment 100, or remote from an electronic resource environment 100.

Figure 6:
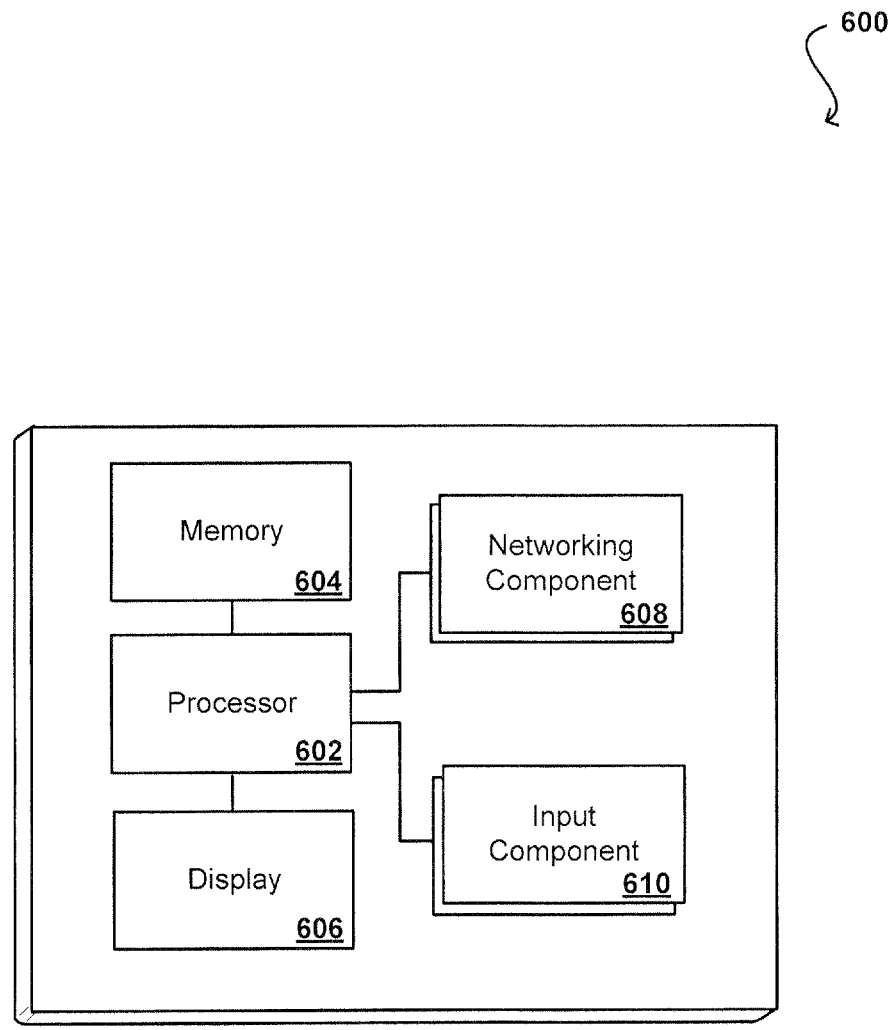
FIG. 6 illustrates a configuration of components of an example computing device that can be used in accordance with various embodiments.

FIG. 6 illustrates an example set of basic components of a computing device 600, such as the electronic resource environment 100 described with respect to FIG. 1. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. The device in some embodiments will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device can include one or more networking components 608 enabling the computing device to communicate over one or more networks, whether wired and/or wireless. The example device can also include at least one additional input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit, at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements' located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network I/O devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. One or more non-transitory computer readable storage media storing instructions for monitoring host computing devices in a multi-tenant environment, the instructions when executed by one or more processors of one or more computer systems cause the one or more computer systems to:
   obtain one or more diagnostic tests for the host computing devices;
   store the one or more diagnostic tests in a centralized location such that virtual machines that are capable of executing in a control plane on a first subset of the host computing devices and that are prevented from accessing a data plane on a second subset of the host computing devices may access the one or more diagnostic tests;
   enable sharing of the one of more diagnostic tests in the multi-tenant environment;

receive diagnostic information from the host computing devices, the diagnostic information including results from the one or more diagnostic tests executed by an agent on one or more components of a particular host computing device in the multi-tenant environment, wherein the one or more diagnostic tests include metadata defining functional attributes of the one or more diagnostic tests;

transmit the diagnostic information to an ingester, the ingester aggregating the diagnostic information associated with the host computing devices to generate aggregated diagnostic information;

receive and store, by at least one generator, the aggregated diagnostic information from the ingester;

sample, by the at least one generator, a database using structured query language (SQL) queries, to generate one or more metrics associated with at least a subset of the host computing devices; and in response to the metrics satisfying at least one criterion, generate a notification based at least in part on the aggregated diagnostic information and the sampled database, the notification including a reference to a console, the console operable to indicate a subset of the host computing devices associated with the generation of the notification, the console further operable to indicate one or more types of failures causing the generation of the notification.

2. The one or more non-transitory computer readable storage media of claim 1, wherein the instructions further cause the processor to:

send the one or more diagnostic tests from the centralized location to the host computing devices.

3. The one or more non-transitory computer readable storage media of claim 1, wherein the instructions further cause the processor to:

store the one or more diagnostics tests in computer readable code in the centralized location.

4. A computing system, comprising:

one or more processors; and a memory device including instructions that, when executed by the one or more processors, cause the computing system to:

obtain one or more diagnostic tests for host computing devices;

store the one or more diagnostic tests in a repository such that virtual machines that are capable of executing in a control plane on a first subset of the host computing devices and that are prevented from accessing a data plane on a second subset of the host computing devices may access the one or more diagnostic tests;

enable sharing of the one of more diagnostic tests in a multi-tenant environment;

receive diagnostic information from the host computing devices, the diagnostic information including results from the one or more diagnostic tests executed by an agent on one or more components of a particular host computing device in the multi-tenant environment, wherein the one or more diagnostic tests include metadata defining functional attributes of the one or more diagnostic tests;

transmit the diagnostic information to an ingester, the ingester aggregating the diagnostic information received from the host computing devices to generate aggregated diagnostic information;

receive the aggregated diagnostic information from the ingester;

store the aggregated diagnostic information in a central database;

sample the central database to generate metrics related to a state of at least a subset of the host computing devices based at least in part on the aggregated diagnostic information; and in response to detecting that the metrics satisfy one or more criteria, generate a notification based at least in part on the aggregated diagnostic information and the sampled central database, the notification including information identifying one or more host computing devices associated with the generation of the notification.

5. The computing system of claim 4, wherein the notification includes an indicator that, in response to a selection of the indicator, causes a console to be displayed, wherein the console is configured to indicate errors associated with the one or more devices.

6. The computing system of claim 4, wherein the memory device further includes instructions that, when executed by the one or more processors, cause the system to:

send the one or more diagnostic tests from the repository to the particular host computing device of the one or more host computing devices.

7. The computing system of claim 4, wherein the memory device further includes instructions that, when executed by the one or more processors, cause the system to:

store the one or more diagnostic tests in computer readable code in the repository.

8. The computing system of claim 4, wherein diagnostic information is received at the ingester from the host computing devices using a distributed queue messaging service.

9. The computing system of claim 4, wherein at least a subset of diagnostic tests are executed in response to detecting that a virtual machine is launched on a host computing device.

10. The computing system of claim 9, wherein the subset of diagnostic tests includes determining whether a user can communicate with a service on a host computing device.

11. The computing system of claim 4, wherein two or more diagnostic tests are associated with one another based on a type of diagnostic test.

12. The computing system of claim 4, wherein a service level agreement is generated based at least in part on the metrics.

13. The computing system of claim 4, wherein diagnostic tests are categorized in a tree data structure.

14. A computer implemented method, comprising:

obtaining one or more diagnostic tests for host computing devices;

storing the one or more diagnostic tests in a centralized location such that virtual machines that are capable of executing in a control plane on a first subset of the host computing devices and that are prevented from accessing a data plane on a second subset of the host computing devices may access the one or more diagnostic tests;

enabling sharing of the one of more diagnostic tests in a multi-tenant environment;

receiving diagnostic information from the host computing devices, the diagnostic information including results from the one or more diagnostic tests executed by agent on one or more components of a particular host computing device in the multi-tenant environment, wherein the one or more diagnostic tests include metadata defining functional attributes of the one or more diagnostic tests;

transmitting the diagnostic information to an ingester, the ingester aggregating the diagnostic information associated with the one or more host computing devices to generate aggregated diagnostic information;

receiving, from the ingester, the aggregated diagnostic information;

storing the aggregated diagnostic information at a database;

generating metrics by sending queries to the database; and in response to at least one of the metrics exceeding a particular threshold, generating a notification based at least in part on the aggregated diagnostic information and the database, the notification including information associated with the diagnostic information.

15. The computer implemented method of claim 14, further comprising:

storing the one or more diagnostic tests such that machines remote from the one or more host computing devices are capable of accessing the one or more diagnostic tests.

16. The computer implemented method of claim 14, further comprising:

utilizing association rule learning to detect a situation that requires remediation.

17. The computer implemented method of claim 16, further comprising:

remediating a failure based at least in part on the detection of the situation that requires remediation.

18. The computer implemented method of claim 14, wherein a service level agreement is generated based at least in part on the metrics.

19. The computer implemented method of claim 14, further comprising:

receiving information produced by diagnostic tests that reside on components remote from the host computing devices.

20. The computer implemented method of claim 14, wherein diagnostic tests are grouped together based at least in part on a feature associated with the host computing device.

\* \* \* \* \*